US011751200B2

(12) United States Patent
Chen (10) Patent No.: US 11,751,200 B2
(45) Date of Patent: Sep. 5, 2023

(54) PHYSICAL CHANNEL STRUCTURES FOR SIDELINK COMMUNICATION

(71) Applicant: MEDIATEK SINGAPORE PTE. LTD., Singapore (SG)

(72) Inventor: Tao Chen, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 107 days.

(21) Appl. No.: 17/068,583

(22) Filed: Oct. 12, 2020

(65) Prior Publication Data

US 2021/0112544 A1 Apr. 15, 2021

Related U.S. Application Data

(63) Continuation of application No. PCT/CN2019/111191, filed on Oct. 15, 2019.

(30) Foreign Application Priority Data

Sep. 30, 2020 (CN) .......................... 202011059907.7

(51) Int. Cl.
*H04L 1/1812* (2023.01)
*H04W 72/21* (2023.01)
*H04W 52/24* (2009.01)

(52) U.S. Cl.
CPC ........... *H04W 72/21* (2023.01); *H04L 1/1812* (2013.01); *H04W 52/242* (2013.01)

(58) Field of Classification Search
CPC ........... H04W 72/0413; H04W 52/242; H04W 52/327; H04W 52/383; H04W 72/02; H04L 1/1812; H04L 1/1854; H04L 1/1864
See application file for complete search history.

(56) References Cited

U.S. PATENT DOCUMENTS

| | | | |
|---|---|---|---|
| 2020/0260472 A1* | 8/2020 | Ganesan | H04W 72/20 |
| 2020/0344722 A1* | 10/2020 | He | H04W 72/0446 |
| 2020/0351057 A1* | 11/2020 | Yeo | H04L 5/0087 |
| 2020/0359375 A1* | 11/2020 | Hwang | H04L 1/1854 |
| 2021/0050950 A1* | 2/2021 | Zhou | H04L 1/1854 |
| 2021/0099901 A1* | 4/2021 | Huang | H04L 1/1812 |
| 2021/0336728 A1* | 10/2021 | Selvanesan | H04L 1/1607 |
| 2022/0052822 A1* | 2/2022 | Lin | H04W 72/20 |
| 2022/0201654 A1* | 6/2022 | Lee | H04L 1/1812 |
| 2022/0209899 A1* | 6/2022 | Lee | H04W 72/1263 |
| 2022/0247539 A1* | 8/2022 | Luo | H04L 1/1854 |

\* cited by examiner

*Primary Examiner* — Edan Orgad
*Assistant Examiner* — Malick A Sohrab
(74) *Attorney, Agent, or Firm* — Oblon, McClelland, Maier & Neustadt, L.L.P.

(57) ABSTRACT

A method of sidelink transmission can include receiving a physical sidelink shared channel (PSSCH) associated with a first two-stage sidelink control information (SCI) at a first user equipment (UE) from a second UE over a sidelink. The first two-stage SCI indicates a physical layer identity (L1-ID) of the second UE. The method can further include determining based on the L1-ID of the second UE a time-frequency resource for transmitting a physical sidelink feedback channel (PSFCH) carrying a hybrid automatic repeat request (HARQ) feedback corresponding to reception of the PSSCH, and transmitting the PSFCH with the determined time-frequency resource. In an embodiment, transmission of the PSSCH from the second UE is a groupcast transmission or a unicast transmission.

18 Claims, 7 Drawing Sheets

PHYSICAL CHANNEL STRUCTURES FOR SIDELINK COMMUNICATION

INCORPORATION BY REFERENCE

This present application claims the benefit of Chinese Patent Application No. 202011059907.7, "Physical Channel Structures for Sidelink Communication" filed on Sep. 30, 2020, which claims the benefit of International Patent Application No. PCT/CN2019/111191, "Physical Channel Structures for Sidelink Communication" filed on Oct. 15, 2019. The disclosures of the prior applications are incorporated herein by reference in their entirety.

TECHNICAL FIELD

The present disclosure relates to wireless communications, and specifically relates to sidelink communications.

BACKGROUND

Cellular based vehicle-to-everything (V2X) (e.g., LTE V2X or NR V2X) is a radio access technology developed by the 3rd Generation Partnership Project (3GPP) to support advanced vehicular applications. In V2X, a direct radio link (referred to as a sidelink) can be established between two vehicles. The sidelink can operate under the control of a cellular system (e.g., radio resource allocation being controlled by a base station) when the vehicles are within the coverage of the cellular system. Or, the sidelink can operate independently when no cellular system is present.

SUMMARY

Aspects of the disclosure provide a method of sidelink transmission. The method can include receiving a physical sidelink shared channel (PSSCH) associated with a first two-stage sidelink control information (SCI) at a first user equipment (UE) from a second UE over a sidelink. The first two-stage SCI indicates a physical layer identity (L1-ID) of the second UE. The method can further include determining based on the L1-ID of the second UE a time-frequency resource for transmitting a physical sidelink feedback channel (PSFCH) carrying a hybrid automatic repeat request (HARQ) feedback corresponding to reception of the PSSCH, and transmitting the PSFCH with the determined time-frequency resource. In an embodiment, transmission of the PSSCH from the second UE is a groupcast transmission or a unicast transmission.

An Embodiment of the method further includes transmitting from the first UE a second two-stage SCI including a field indicating whether there is data transmission associated with the second two-stage SCI. In an example, a 1st-stage SCI of the second two-stage SCI indicates there is no data transmission associated with the second two-stage SCI, and a 2nd-stage SCI of the second two-stage SCI is mapped to resources indicated by the 1st-stage SCI that would be assigned for the data transmission associated with the second two-stage SCI if there is the data transmission associated with the second two-stage SCI.

Another embodiment of the method further includes transmitting a third two-stage SCI in a groupcast transmission from the first UE, a 1st-stage or a 2nd-stage SCI of the third two-stage SCI indicating a transmission power of the first UE for the groupcast transmission.

Another embodiment of the method further includes receiving a fourth two-stage SCI from a third UE performing a groupcast transmission, a 1st-stage or a 2nd-stage SCI of the fourth two-stage SCI indicating a transmission power of the third UE, determining a pathloss for the groupcast transmission between the third UE and the first UE based on the indicated transmission power of the third UE, and determining a transmission power for transmitting a PSFCH from the first UE to the third UE according to the determined pathloss.

Another embodiment of the method further includes transmitting a PSSCH over a sidelink from the first UE using a resource scheduled by a base station serving the first UE, receiving in a slot a HARQ feedback in a PSFCH corresponding to the transmitted PSSCH, and forwarding the received HARQ feedback to the base station using a resource reserved for a physical uplink control channel (PUCCH) or a physical uplink shared channel (PUSCH). A timing of the reserved resource being the slot plus a configured time offset.

Another embodiment of the method further includes receiving multiple HARQ feedbacks from a fourth UE at a same slot corresponding to multiple sidelink transmissions from the first UE to the fourth UE, and forwarding the multiple HARQ feedbacks to a base station in a resource reserved for a PUCCH or a PUSCH.

Aspects of the disclosure provide an apparatus comprising circuitry. The circuitry can be configured to receive a PSSCH associated with a first two-stage SCI indicating a L1-ID of the second UE at a first UE from a second UE over a sidelink, determine based on the L1-ID of the second UE a time-frequency resource for transmitting a PSFCH carrying a HARQ feedback corresponding to reception of the PSSCH, and transmit the PSFCH with the determined time-frequency resource.

Aspects of the disclosure provide a non-transitory computer-readable medium storing instructions that, when executed by a processor, causing the processor to perform the method of sidelink transmission.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
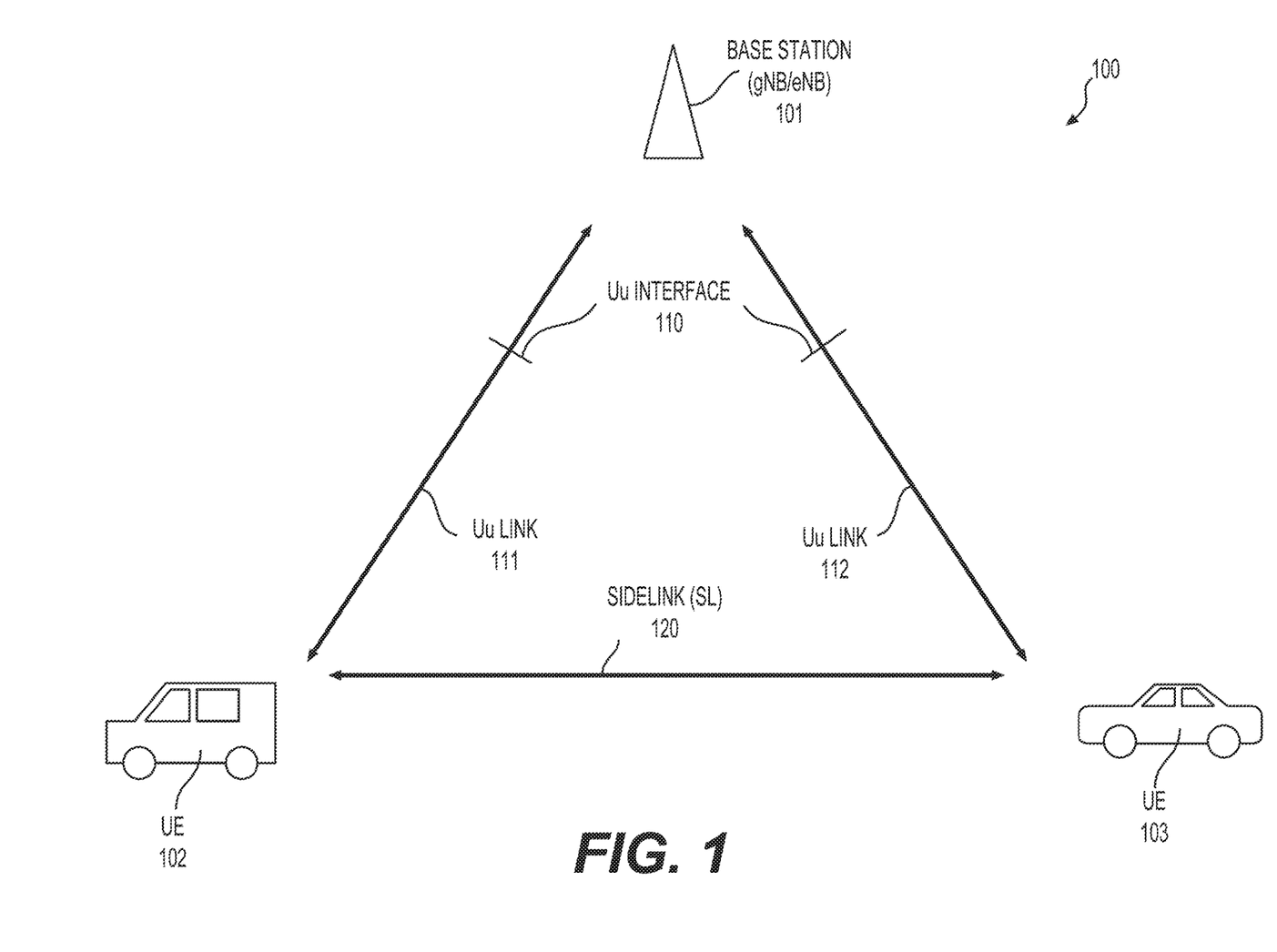
FIG. 1 shows a wireless communication system 100 according to an embodiment of the disclosure.

FIG. 1 shows a wireless communication system 100 according to an embodiment of the disclosure. The system 100 can include a base station (BS) 101, a first user equipment (UE) 102, and a second UE 103. The BS 101 can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS 101 can communicate with the UE 102 or 103 via a radio air interface 110 (referred to as a Uu interface 110) according to respective wireless communication protocols. In other examples, the BS 101 may implement other types of standardized or non-standardized radio access technologies, and communicate with the UE 102 or 103 according to the respective radio access technologies. The UE 102 or 103 can be a vehicle, a computer, a mobile phone, a roadside unit, and the like.

The UEs 102 and 103 can communicate with each other based on vehicle-to-everything (V2X) technologies, for example, as specified in 3GPP standards. A direct radio link 120, referred to as a sidelink (SL), can be established between the UEs 102 and 103. The sidelink 120 can be either a sidelink from the UE 102 to the UE 103, or a sidelink from the UE 103 to the UE 102. The UE 102 can use a same spectrum for both uplink transmissions over a Uu link 111 and sidelink transmissions over the sidelink 120. Similarly, the UE 103 can use a same spectrum for both uplink transmissions over a Uu link 112 and SL transmissions over the sidelink 120. In addition, allocation of radio resources over the sidelink 120 can be controlled by the BS 101.

Different from the FIG. 1 example (in-coverage scenario) where the UEs 102 and 103 performing sidelink communications are under network coverage (the coverage of a cell of the BS 101), in other examples, UEs performing sidelink communications can be outside of network coverage. For example, a sidelink can be established between two UEs both of which are located outside of network coverage (out-of-coverage scenario), or one of which is located outside of network coverage (partial-coverage scenario).

In some examples, a group of UEs (such as the UEs 102 and 103 and other UEs (not shown)) in a local area may communicate with each other using sidelinks under or without control of a base station. Each UE in the group may periodically or a periodically transmits messages to neighboring UEs. In addition, the respective transmissions can be of a type of unicast, groupcast, or broadcast. For example, hybrid automatic repeat request (HARQ) and link adaptation mechanisms can be employed to support unicast or groupcast between a transmission (Tx) UE and a reception UE(s).

Figure 2:
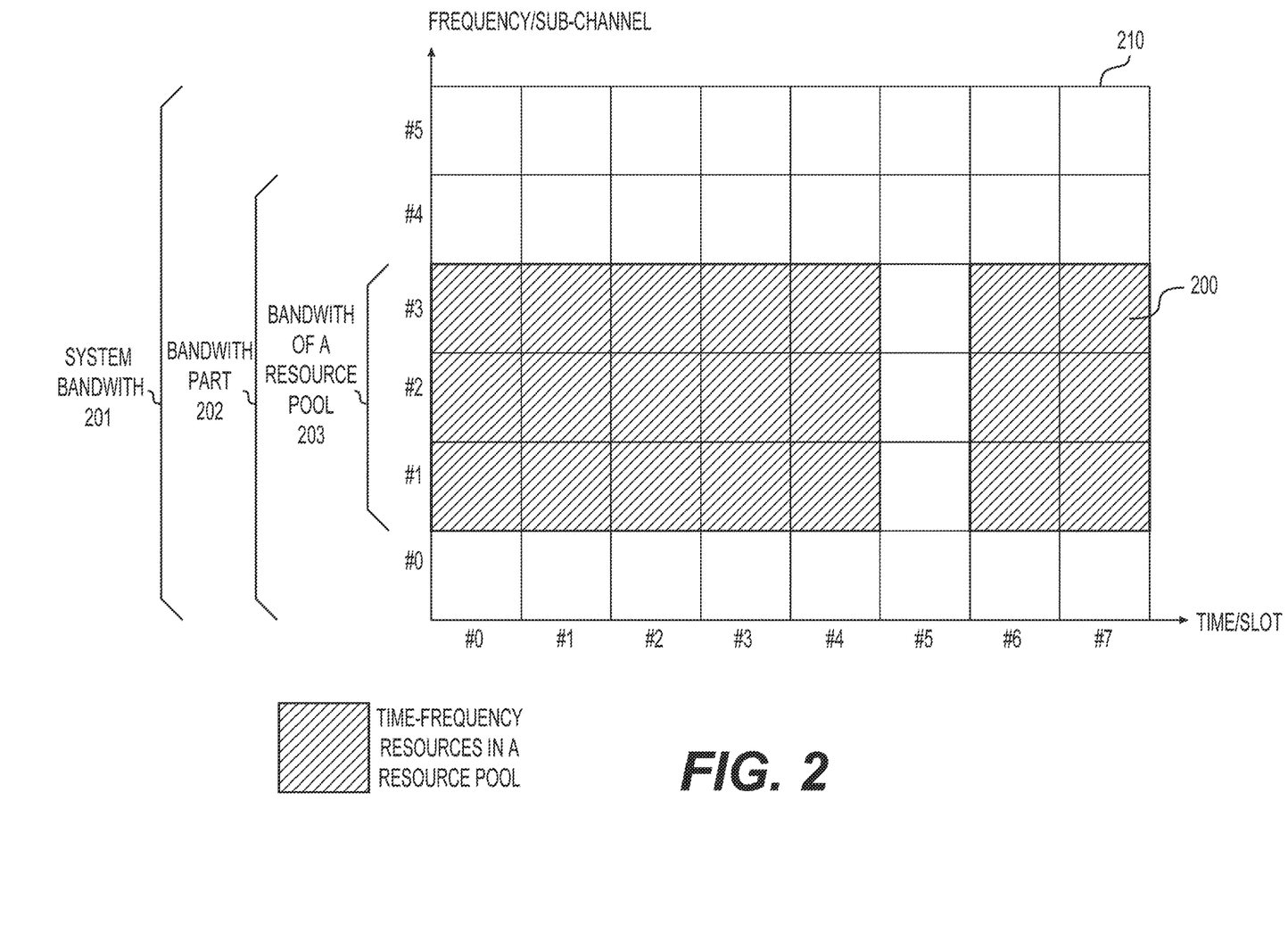
FIG. 2 shows a resource pool 200 configured for sidelink communications according to an embodiment of the disclosure.

FIG. 2 shows an example of a resource pool 200 configured for sidelink communications according to an embodiment of the disclosure. For example, the resource pool 200 can be configured to the UE 102 from the BS 101, or can be pre-configured to the UE 102 (e.g., a resource pool configuration is stored in a universal integrated circuit card (UICC) of the UE 102). The resource pool 200 can be defined over a time-frequency (slot/sub-channel) resource grid 210. Radio resources for transmission of physical channels (e.g., physical sidelink control channel (PSCCH), physical sidelink shared channel (PSSCH), and the like) from the UE 102 on the sidelink 120 can be allocated based on the resource pool 200.

As shown, a system bandwidth 201 of the UE 102 can include sub-channels #0-#5. Each sub-channel may include a number of physical resource blocks (PRBs, or RBs) (e.g., 5, 10, or 20 PRBs). The resource pool 200 can include a set of consecutive (or non-consecutive) sub-channels #1-#3 in frequency domain. If the UE 102 operates in a bandwidth part (BWP) 202, a bandwidth 203 of the resource pool 200 can be configured to be within the BWP 202. In time domain, the resource pool 200 can include a number of slots (e.g., slots #0-#4 and #6-#7) that can be consecutive or non-consecutive in different examples.

Resource pools can be (pre-)configured to the UE 102 separately from the transmission perspective (Tx pools) and the reception perspective (Rx pools). Accordingly, the UE 102 can monitor for PSCCHs, and hence receive respective PSSCH transmissions from other UEs in a Rx pool while performing transmissions in a Tx pool.

In an embodiment, within each of the slots of the resource pool 200, there can be from 7 to 14 of the symbols reserved for sidelink operation, of which PSSCH can be transmitted in 5 to 12 symbols, respectively. The remaining sidelink symbols in each slot (not used for PSSCH transmission) can transmit physical sidelink feedback channel (PSFCH), automatic gain control (AGC) symbol(s), guard period (GP) symbol(s), or uplink or downlink symbols.

In an embodiment, two resource allocation modes (Mode 1 and Mode 2) can be used for allocating radio resources for PSCCH and PSSCH transmissions over a sidelink. In Mode 1, the BS 101 performs the function of resource scheduling. For example, the BS 101 can provide dynamic grants of sidelink resources, or semi-statically configured grants of periodic sidelink resources (referred to as sidelink configured grants) to the UE 102 for sidelink communications over the sidelink 120.

A dynamic sidelink grant can be provided in a downlink control information (DCI), and schedule resources for an initial transmission of a transport block, and optionally, retransmissions of the same transport block. The retransmissions can be blindly repeated transmissions, or can be retransmissions in response to a HARQ feedback. In one example, resources for each transmission or retransmission can be spanned over one or more sub-channels but limited within one slot in the sidelink resource pool 200.

For a sidelink configured grant, the scheduled resources can be a set of sidelink resources recurring with a periodicity to accommodate periodically transmitted messages. Two types of configured grant are defined in an example. The Type 1 configured grant can be configured once (e.g., by radio resource control (RRC) signaling) and used by the UE 102 immediately until being released by RRC signaling. The Type 2 configured grant can be configured once. Activation or deactivation signaling via a DCI can be employed to start or terminate usage of the Type 2 configured grant. Multiple configured grants can be configured to allow provision for different services, traffic types, etc.

In an embodiment, modulation and coding scheme (MCS) information for dynamic and configured grants can optionally be provided or constrained by RRC signaling instead of traditional DCI. RRC can configure an exact MCS, or a range of MCS. In an example, RRC does not provide the exact MCS, a transmitting UE can select an appropriate MCS itself based on the knowledge of a transport block (TB) to be transmitted and, potentially, sidelink radio conditions.

When the UE 102 is in an out-of-coverage status, or the UE 102 is in an in-coverage status but instructed by the BS 101, Mode 2 can be employed for resource scheduling (resource allocation). In Mode 2, the UE 102 can autonomously select resources for sidelink transmissions based on a sensing procedure. For example, the UE 102 can sense, within a (pre-)configured resource pool, which resources are not in use by other UEs with higher-priority traffic, and select an appropriate amount of resources for sidelink initial transmissions and, optionally, retransmissions. In the selected such resources, the UE 102 can transmit and re-transmit a certain number of times.

For example, the UE 102 can reserve resources to be used for a number of blind (re-)transmissions or HARQ-feedback-based (re-)transmissions of a transport block. The UE 102 can also reserve resources to be used for an initial transmission of a later transport block. The reserved resources can be indicated in an SCI scheduling a transmission of a transport block. Alternatively, an initial transmission of a transport block can be performed after sensing and resource selection, but without a reservation.

SCIs (e.g., 1st-stage SCI) transmitted by UEs on PSCCH indicate selected (or reserved) time-frequency resources in which the respective UE will transmit a PSSCH. (The indicated time-frequency resources can be allocated with either Mode 1 or Mode 2.) These SCI transmissions can be used by sensing UEs to maintain a record of which resources have been reserved by other UEs in the recent past. When a resource selection is triggered (e.g. by traffic arrival or a resource re-selection trigger), the UE 102 (while performing sensing) considers a sensing window which starts a (pre-)configured time in the past and finishes shortly before the trigger time. The sensing UE 102 also measures, for example, the PSSCH reference signal received power (RSRP) over selected or reserved resources in the slots of the sensing window. The measurements can indicates a level of interference which would be experienced if the sensing UE 102 were to transmit in the selected or reserved resources.

The sensing UE 102 can then select resources for transmission(s) or retransmission(s) from within a resource selection window. For example, the resource selection window starts after the trigger for transmission, and cannot be longer than a remaining latency budget of a to-be-transmitted transport block. Based on the SCIs from the other UEs and the measurements as described above, selected or reserved resources by the other UEs in the selection window with PSSCH-RSRP above a threshold are excluded from being candidates by the sensing UE 102. The threshold can be set according to priorities of the traffic (e.g., priorities associated with respective transport blocks) of the sensing UEs and the other transmitting UEs. Thus, a higher priority transmission from the sensing UE 102 can occupy resources which are reserved by a transmitting UE with sufficiently low PSSCH-RSRP and sufficiently lower-priority traffic.

In an example, from the set of resources in the selection window which have not been excluded, the sensing UE can identify a certain percentage (e.g., 20%) of the available resources within the window as candidate resources. The UE 102 may select from the candidate resources for a number of initial- or re-transmissions of the to-be-transmitted transport block, for example, in a random way.

Figure 3:
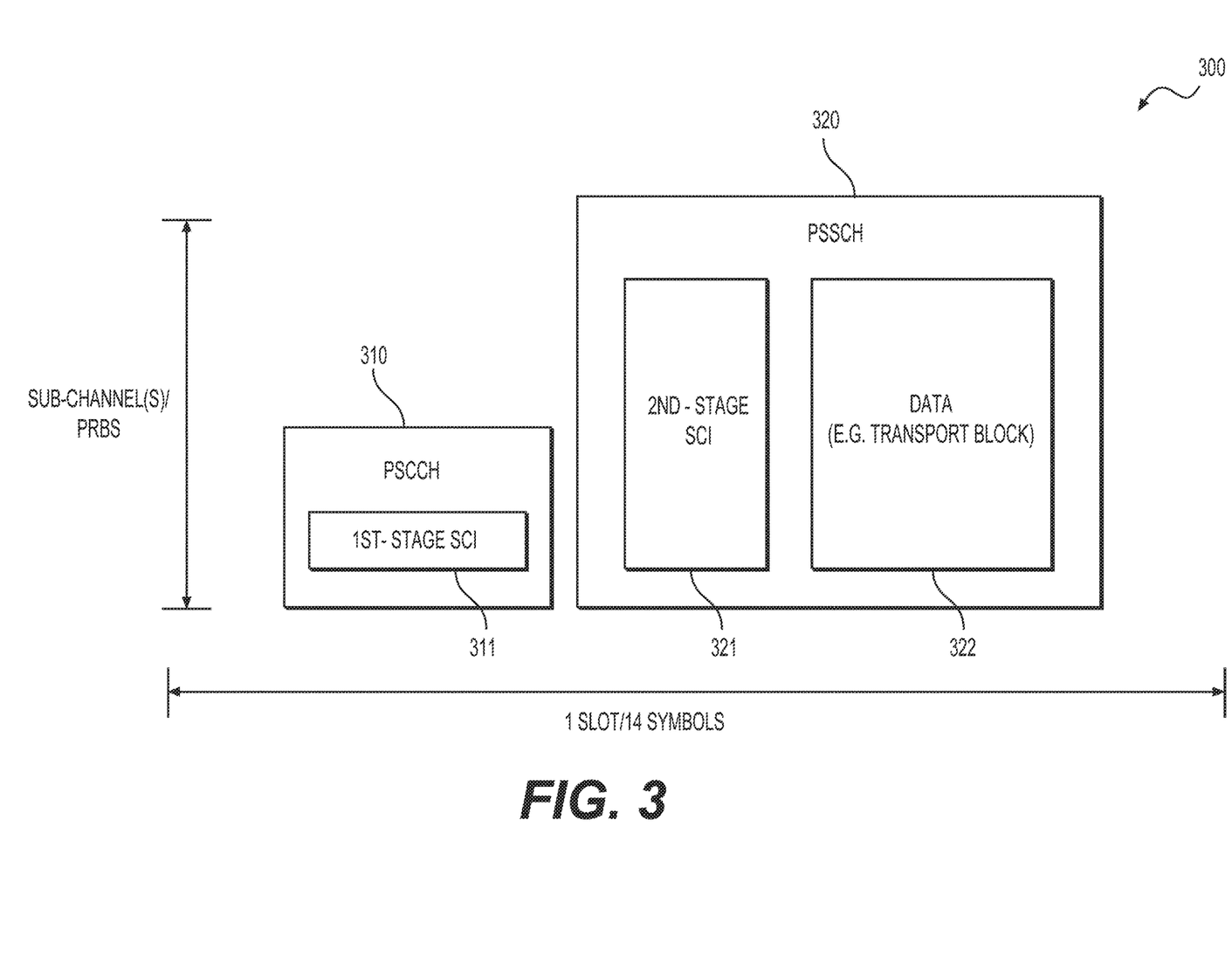
FIG. 3 shows a sidelink transmission 300 with a two-stage sidelink control information (SCI) according to an embodiment of the disclosure.

FIG. 3 shows an example of a sidelink transmission 300 with a two-stage SCI according to an embodiment of the disclosure. In the sidelink transmission 300, a PSCCH 310 and a PSSCH 320 associated with the PSCCH 310 can be generated and transmitted from the UE 102. The PSCCH 310 can carry a 1st-stage SCI 311, while the PSSCH 320 can carry a 2nd-stage SCI 321 and data 322 (e.g., data of a transport block and optionally other type of data). For example, the 1st-stage or 2nd-stage SCI can be generated and processed (e.g., channel coding, modulation, precoding, and the like) at a physical layer before being mapped to resource elements (REs) in the respective physical channels (e.g., PSCCH 310 or PSSCH 320). The transport block can be received from a higher layer (e.g., medium access control (MAC) layer) and processed (e.g., channel coding, modulation, precoding, and the like) at the physical layer before being mapped to REs in the respective PSSCH 320.

In one example, the UE 102 can be configured to perform each transmission or retransmission of a transport block or other type of data within a slot in time domain. Accordingly, as shown in FIG. 3, resources for transmitting PSCCH 310 and PSSCH 320 can be selected in a Tx resource pool within a slot in time domain and one or more sub-channels in frequency domain. In an example, a slot may include 14 symbols (e.g., orthogonal frequency division multiplexing (OFDM) symbols) but may have different duration depending on respective sub-carrier spacings. For example, corresponding to different sub-carrier spacings 15 kHz, 30 kHz, or 60 kHz, a 1-ms subframe may include 1, 2, or 4 slots each including 14 symbols.

In other examples, the PSCCH 310 and the PSSCH 320 may be transmitted in different slots. Accordingly, resources for transmitting PSCCH 310 and PSSCH 320 can be selected from different slots in a Tx resource pool.

In FIG. 3, the PSCCH 310 and the PSSCH 320 are shown to be time-division multiplexed (TDMed). However, in other examples, the PSCCH 310 and the PSSCH 320 can be frequency-division multiplexed (FDMed). For example, within the bandwidth of the assigned sub-channels in FIG. 3, the resources above the PSCCH 310 can also be assigned for transmission of the PSSCH 320.

Figure 4:
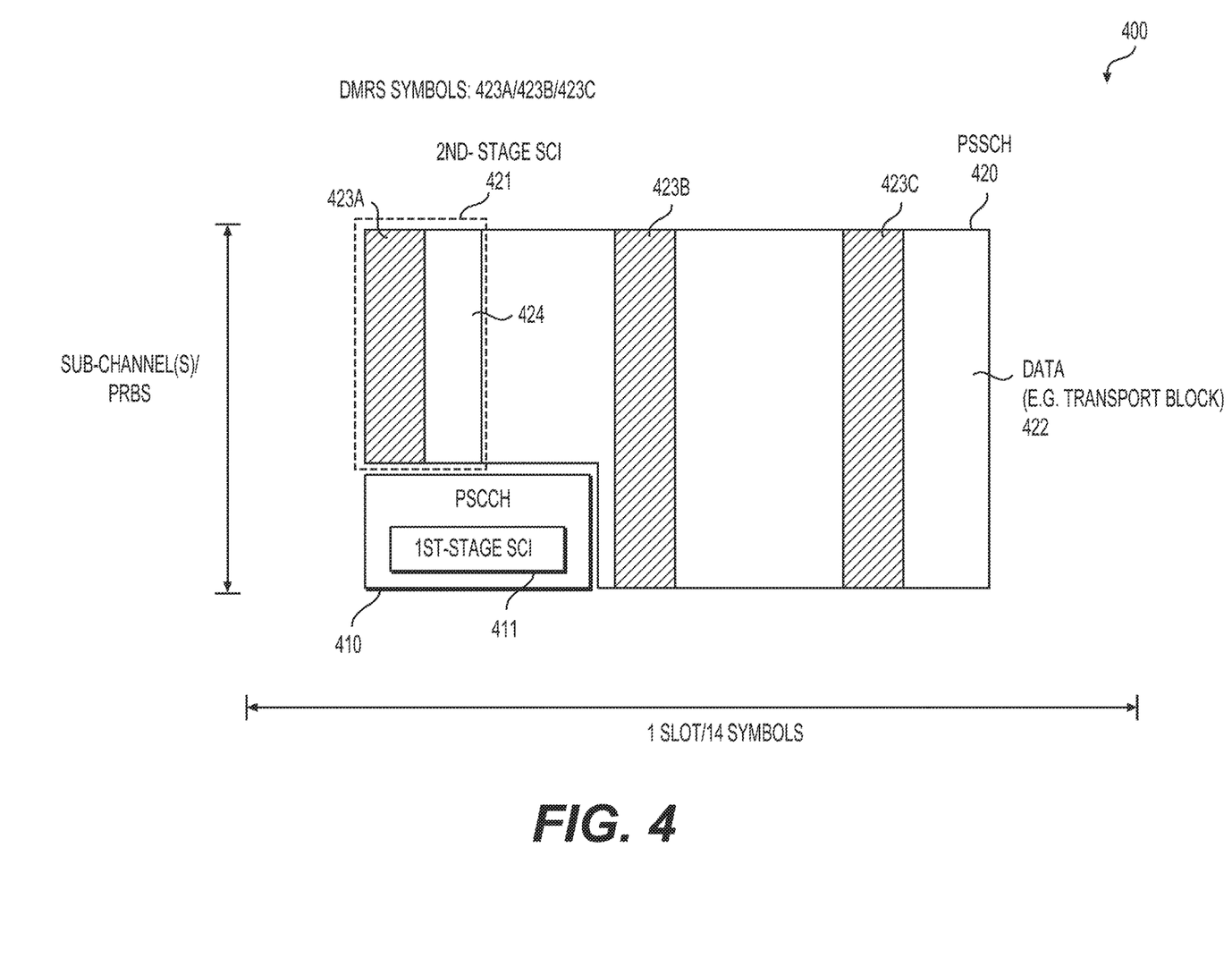
FIG. 4 shows another sidelink transmission 400 with a two-stage SCI according to an embodiment of the disclosure.

FIG. 4 shows another example of a sidelink transmission 400 with a two-stage SCI according to an embodiment of the disclosure. In the sidelink transmission 400, a PSCCH 410 and an associated PSSCH 420 can be generated and transmitted from the UE 102. The PSCCH 410 can carry a 1st-stage SCI 411, while the PSSCH 420 can carry a 2nd-stage SCI 421 and data 422 (e.g., data of a transport block). Similar to the FIG. 3 example, time-frequency resources for transmitting PSCCH 410 and the PSSCH 420 can be selected to be within a slot in time domain and one or more sub-channels in frequency domain in a Tx resource pool. Different from the FIG. 3 example, the PSSCH 420 is TDMed and FDMed with the PSCCH 410.

In addition, as shown in FIG. 4, the PSSCH 420 can be multiplexed with a demodulation reference signal (DMRS) mapped in several symbols 423A, 423B, and 423C (referred to as DMRS symbols). In an example, PRBs in the DMRS symbols can each include REs in which the DMRS is mapped. The REs carrying the DMRS in one DMRS symbol may form a comb-alike structure in some examples. REs without carrying the DMRS in one DMRS symbol can be used to carry the 2nd-stage SCI 421 or the data 422.

Two-stage SCI is used for sidelink transmission in the examples of FIG. 3 and FIG. 4. The corresponding sidelink transmissions 300 or 400 can be of a type of unicast, groupcast, or broadcast. During the transmissions 300/400, the 1st-stage SCI 311/411 can be employed for sensing purpose and carry information related to channel sensing. The 1st-stage SCI 311/411 can also carry information of resource allocation of the respective PSSCH 320/420.

The 2nd-stage SCI 321/421 can carry information (e.g., new data indicator, and redundancy version (RV)) needed for identifying and decoding the data 322/422, controlling HARQ procedures, triggering channel state information (CSI) feedback, and the like. The 2nd-stage SCI 321/421 can be transmitted with link adaptation based on channel conditions between the Tx UE 102 and the target UEs. For example, a high coding rate may be used for transmitting the 2nd-stage SCI 321/421 to improve spectra efficiency. The high coding rate can be determined based on a signal to noise ratio (SNR) level of channels between the Tx UE 102 and the target UEs. In an example, polar code is used for channel coding of the 2nd-stage SCI 321/421.

In an embodiment, a sequence of a DMRS (such as the DMRS in the FIG. 4 example) multiplexed with a PSSCH can be generated based on a physical layer (L1) source identify (ID) and an L1 destination ID. For example, for a unicast sidelink transmission, the DMRS sequence can be generated based on an L1 UE source ID and an L1 UE destination ID. For a groupcast sidelink transmission, the DMRS sequence can be generated based on an L group source ID and an L1 group destination ID. In addition, a part or a whole of the respective source or destination L1 ID can be used for generation of the DMRS sequence in different examples. The partial/full L1 UE/group source ID and partial/full L1 UE/group destination ID can identify link pair(s) or groupcast transmissions uniquely to avoid confusion/collision between links. In an embodiment, a part of L1 UE/group source ID and a part of L1 UE/group destination ID are indicated in the 1st-stage SCI, and are used for sequence generation of the DMRS.

In an example, the sequence can be generated according to $$r(n) = \frac{1}{\sqrt{2}}(1 - 2c \cdot (2n)) + j\frac{1}{\sqrt{2}}(1 - 2 \cdot c(2n+1))$$

where c(i) is a pseudo-random sequence defined by a length-31 Gold sequence. The output sequence c(n) of length $M_{PN}$, where n=0, 1, . . . , $M_{PN}$−1, is defined by $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where Nc=1600 and the first m-sequence $x_1(n)$ can be initialized with $x_1(0)$=1, $x_1(n)$=0, n=1, 2, . . . , 30. The initialization of the second m-sequence $x_2(n)$ is denoted by $c_{init} = \sum_{i=0}^{30} x_2(i) \cdot 2^i$ and has values depending on application of the sequence, where i=0, 1, . . . , 30. Alternatively, c(i) can be another length-31 Gold sequence.

In an example, for the length-31 Gold sequence used for DMRS sequence generation, the pseudo-random sequence generator can be initialized with $C_{init}=(2^x(N_{symbol}^{slot} n_{s,f}^\mu + l + 1)(2^y N_{src\_ID}+2^z N_{dest\_ID}+1)+2^y N_{src\_ID}+2^z N_{dest\_ID}) \bmod 2^{31}$. In this expression, l is the OFDM symbol number within the slot, and $n_{s,f}^\mu$ is the slot number within a frame. x,y,z are positive integer numbers or zero. For example, $C_{init}=(2^0 (N_{symbol}^{slot} n_{s,f}^\mu + l + 1)(2^5 N_{src\_ID}+N_{dest\_ID}+1)+2^5 N_{src\_ID}+N_{dest\_ID}) \bmod 2^{31}$ given x=9, y=5, z=0 assuming 4 bits of $N_{dest\_ID}$ and 4 bits of $N_{src\_ID}$. $N_{dest\_ID}$ and $N_{src\_ID}$ denote the full/part of L1 UE/group destination ID and full/part of L1 UE/group source ID respectively, and are used for the data DMRS sequence generation. The position of these two parameters ($N_{dest\_ID}$ and $N_{src\_ID}$) in the expression can be swapped. These two parameters ($N_{dest\_ID}$ and $N_{src\_ID}$) can be (pre-)configured and/or signaled by SCI (e.g., 1st-stage SCI of the two-stage SCI). The ID information used for data DMRS sequence generation may be part or full of the L1 ID information. Additionally, in case of a part of the ID information is used for the sequence generation, the remaining part of the ID information can be carried by a 2nd-stage SCI and/or other higher layer signaling such as RRC or MAC signaling.

In different examples, there can be one or both of a source ID (e.g., an L1 UE/group source ID) and a destination ID (e.g., an L1 UE/group destination ID) used for DMRS sequence generation. In an example, one of the source and destination IDs is not present in a two-stage SCI (e.g., there may be only a source ID but no destination ID is used for DMRS sequence generation for a broadcast transmission), a value of the ID not present can be set as 0. In an example, different SCI formats can be indicated in a 1st-stage SCI such that a Rx UE can interpret the SCI contents correctly. For example, corresponding to different SCI formats, based on the SCI format indication, the Rx UE can understand whether one or both of a source ID and a destination ID are included in the SCI, and a length of the source or destination ID (e.g., whether full ID information or a part of the ID information is used for DMRS sequence generation).

In an example, to associate with respective link pair(s), a cyclic redundancy check (CRC) for data in a PSSCH scheduled by a two-stage SCI is scrambled by a whole or a part of an L1 UE/group source ID and/or a whole or a part of an L1 UE/group destination ID. Such ID information can be obtained from one or both of a 1st-stage SCI and 2nd-stage SCI of the two-stage SCI. For example, the 1st-stage SCI and/or the 2nd-stage SCI can carry a part or a whole of the L1 source and/or destination ID.

In an example, no destination ID is used for broadcast communications. In this case, data DMRS (PSSCH DMRS) generation and respective data CRC scrambling may not use an L1 UE/group destination ID.

In an embodiment, a standalone SCI is employed. For example, an SCI (e.g., a 1st-stage SCI or a 2nd-stage SCI) can include a field (e.g., 1 bit) to dynamically indicate whether there is an associated data transmission (e.g., data of a TB). In an example, when a 1st-stage SCI indicates there is no associated data transmission, an associated 2nd-stage SCI can be mapped to the whole PSSCH region indicated by the 1st-stage SCI. As a result, resources that could have been used for data transmission can now be used to provide additional capacity for SCI transmission. In case that no data is transmitted, the 2nd-stage SCI with increased capacity can be used for transmission of CSI measurement results, HARQ feedback, or other information.

In an embodiment, a 2nd-stage SCI is not transmitted, and only a 1st-stage SCI and data is transmitted. For example, when configured grant of Mode 1 resource allocation is used, bits for indicating granted resources for repeated data transmissions can be excluded from the 2nd-stage SCI. The remaining bits of the 2nd-stage SCI may be transmitted by other means (for example, carried by DMRS sequences). In an example, the 1st-stage SCI may carry a field indicating whether the 2nd-stage SCI is transmitted or not.

In an embodiment, instead of using 1st-stage SCI or 2nd-stage SCI for indicating standalone SCI or transmission without 2nd-stage SCI, a configuration associated with a resource pool can be used to indicate different usage scenarios. For example, the configuration can be signaled from a BS to UEs, or can be preconfigured to UEs (e.g., stored in the UEs).

Figure 5A:
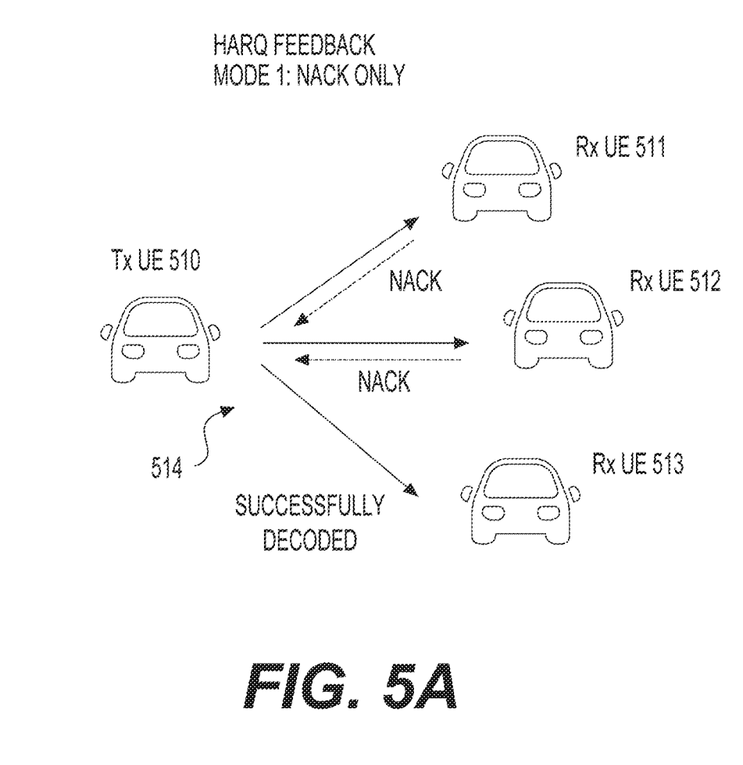
FIGS. 5A-5B show examples of two hybrid automatic repeat request (HARQ) feedback modes used for sidelink groupcast communications.
Figure 5B:
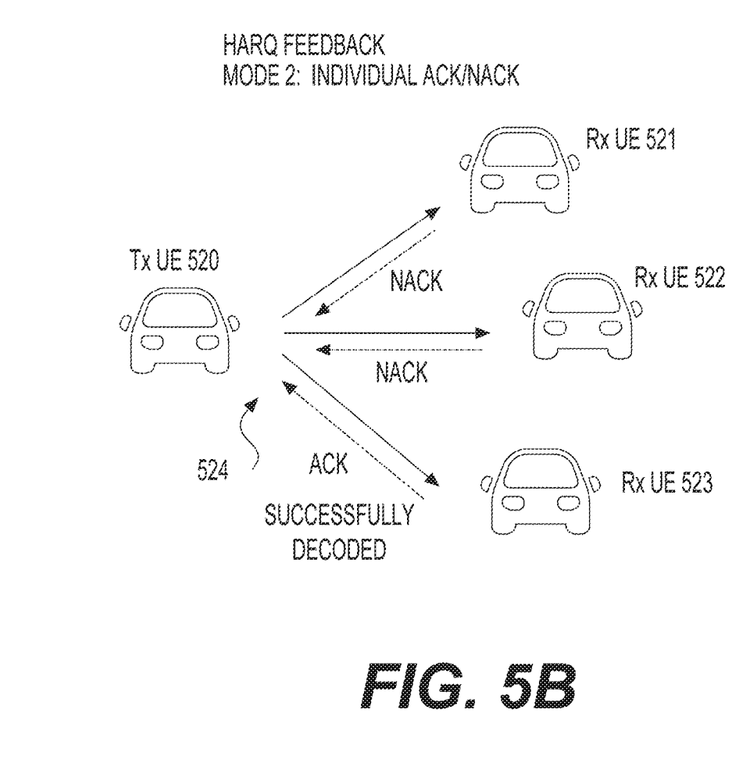

FIGS. 5A-5B show examples of two HARQ feedback modes used for sidelink groupcast communications. FIG. 5A shows a first HARQ feedback mode (Mode 1) where Rx UEs 511-512 share a same PSFCH (i.e., same resource) corresponding to a transmission 514 from a Tx UE 510. As shown, the Rx UE 513 successfully decoded the transmission 514 without provide a feedback. The Rx UEs 511-512 failed to decode the transmission 514, and each transmits a negative acknowledgement (NACK) feedback. However, as the Rx UEs 511-512 share the same HARQ feedback channel, the Tx UE 510 can receive overlapped signals of the NACK feedbacks in the shared HARQ feedback channel but cannot distinguish which of the Rx UE 511, 512, or 513 transmits the NACK feedbacks.

FIG. 5B shows a second HARQ feedback mode (Mode 2) where Rx UEs 521-523 each have a dedicated HARQ feedback channel (resources) corresponding to a transmission 524 from a Tx UE 520. As shown, the Rx UEs 521-523 can each provide individual positive acknowledgement (ACK) or NACK feedbacks. The Tx UE 520 can distinguish the individual ACK or NACK feedbacks. In addition, as each destination Rx UE 521-523 has the dedicated HARQ feedback channel, the Tx UE 520 can recognize a status where no feedback is provided from the respective Rx UE in the respective dedicated HARQ feedback channel.

Figure 6:
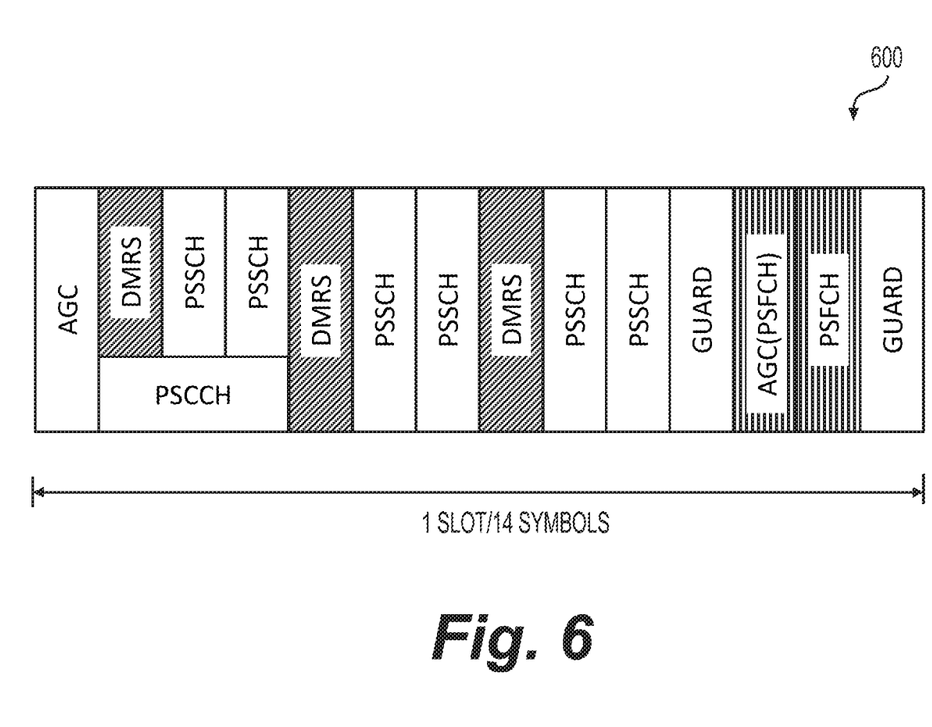
FIG. 6 shows a slot structure 600 for sidelink transmission according to an embodiment of the disclosure.

FIG. 6 shows a slot structure 600 for sidelink transmission according to an embodiment of the disclosure. The slot structure 600 is 14 symbols long, and includes an AGC symbol at the beginning, a 9-symbol PSSCH multiplexed with a 3-symbol DMRS and a 3-symbol PSCCH. In addition, a PSFCH is transmitted twice over two symbols at the end of the slot structure 600 excluding a last GP symbol. The first PSFCH symbol can be used for AGC purpose. Another GP symbol is positioned between the last PSSCH symbol and the first PSFCH symbol.

In an example, the PSFCH carries 1 bit for a HARQ ACK or NACK over 1 RB. For example, a pair of sequences with different cyclic shift can be used for HARQ ACK or NACK, respectively, and transmitted over 1 RB. Such type of PSFCH is referred to as sequence-based PSFCH.

In an example, PSFCH resources can be configured every 1, 2, or 4 slots. Accordingly, multiple HARQ feedbacks corresponding to multiple sidelink transmissions may be transmitted in one PSFCH symbol. For example, multiple time-frequency domain resources (PRBs) and/or code domain resources (sequence pairs) can be configured over one PSFCH symbol for feedback of multiple bits of HARQ ACK or NACK.

In an embodiment, for sidelink groupcast transmission, a Tx UE can indicate a transmission power in an SCI (e.g., 1st-stage SCI or 2nd-stage SCI) for the purpose of power control at a Rx UE. For example, based on the indication of the transmission power at the Tx UE, the Rx UE can derive a pathloss between the Tx UE and the Rx UE, and accordingly determine a suitable transmission power for a feedback channel (e.g., carrying HAQR feedback, CSI, and the like). For example, for a Rx UE far away from the Tx UE, transmission of a feedback channel can use a higher transmission power, while for a Rx UE close to the Tx UE, transmission of a feedback channel can use a lower transmission power. In this way, the near-far problem for reception of multiple feedbacks from a group of Rx UEs at the Tx UE can be avoided.

In an embodiment, for the purpose of power control, an alpha and PO parameter used for power control in sidelink groupcast can be (pre-)configured or indicated by SCI (1st-stage or 2nd-stage SCI) of the Tx UE. The (pre-)configuration of the parameters can be per BWP, per resource pool, or per groupcast group.

In an embodiment, time and/or frequency resources for PSFCH transmissions can be implicitly determined based on one or more of the following parameters: partial/full L1 UE/group source ID, partial/full L1 UE/group destination ID, a time and/or frequency location of a control channel, a time and/or frequency location of a data channel. Based on such link pair based implicit mapping, UEs performing sidelink transmissions can know where to transmit and receive PSFCHs.

For example, corresponding to a sidelink transmission from a Tx UE to a Rx UE, the Rx UE can determine a resource for a PSFCH transmission as follows. For time domain resource (e.g., which slot and symbol), an offset of K slots between a slot of the original sidelink transmission and a slot carrying a PSFCH can be configured, for example, for a resource pool. K can be 2, 3, 4, or the like. Accordingly, based on a time location of a PSCCH or PSSCH received at the Rx UE, a slot for the PSFCH transmission can be determined. As in the FIG. 6 example, positions of PSFCH symbols can be determined.

For frequency domain resources (e.g., which RB), based on a frequency location of the PSCCH or PSSCH received at the Rx UE, a set of frequency resources (RBs) can be determined based on a preconfigured mapping rule. Subsequently, among the set of RBs, one RB can be selected based on partial/full L1 UE/group source ID, or a combination of partial/full L1 UE/group source ID and partial/full L1 UE/group destination ID. For a unicast transmission or a groupcast transmission with Mode 1 HARQ feedback (e.g., NACK only), the RB can be selected based on partial/full L1 UE/group source ID. In an example, the set of RBs can be assigned with indices, and a result of a modulo division operation of an L1 source ID over a total number of the RBs can be determined to be an index of the selected RB. For a groupcast transmission with Mode 2 HARQ feedback (e.g., separate ACK/NACK), a sum of an L1 source ID and an L1 destination ID together can be used to determine an RB index by similarly using the modulo division operation.

In an embodiment, for sidelink transmissions from a Tx UE to a Rx UE, the Tx UE can forward HARQ feedback information received from the Rx UE to a BS serving the Tx UE. The BS can reserve an additional PUCCH/PUSCH resource pool for the Tx UE to transmit the Rx UE's feedback information via reserved PUCCH/PUSCH channel(s). A transmission timing for the Tx UE to forward the Rx UE's HARQ feedback information via a PUCCH can be derived according to a slot receiving the HARQ feedback from the Rx UE plus a time offset. The time offset provides time for processing reception of the HARQ feedback and preparation of transmission to the BS. Such timing information is also known at BS such that the BS can reserve resources and receive the channels for the forwarding operation.

In an embodiment, multiple sidelink HARQ feedbacks (e.g., ACK or NACK) of a Rx UE can be forwarded together in one transmission by a Tx UE to a BS. Thus, a feedback channel carrying a larger size of feedback information may be provided. For example, the BS can reserve the corresponding resources for the Tx UE to transmit multiple sidelink data HARQ feedbacks. For example, PUSCH type resources can be used to forward the multiple sidelink HARQ feedbacks at the same time (during one transmission) by the Tx UE. Each bit or location in the transmission may be corresponding to one HARQ feedback. The multiple HARQ feedbacks may be mapped in a specific order so that the BS can derive the corresponding transmission of each HARQ feedback. In other examples, a PUCCH resource can be used to carry a few bits of information with different ACK/NACK bit location corresponding to the different data transmissions.

In an example, a Tx UE can forward only ACK feedback(s) or NACK feedback(s) in order to save overhead based on a (pre-)configuration.

In an embodiment, to avoid a collision between a Tx UE's Uu-interface HARQ feedback/control/data and forwarded sidelink HARQ feedbacks, the Tx UE may combine the Uu-interface transmission and the forwarded sidelink feedback information into one transmission. For example, sidelink HARQ feedbacks and Uu HARQ feedbacks can be multiplexed into one channel (e.g., a PUCCH channel or a PUSCH channel). A (pre-)configuration can specify proper time and/or frequency locations or different bit locations for carrying Uu-interface and sidelink HARQ feedback information respectively. The (pre-)configuration can be signaled to the Tx UE or stored at the Tx UE. In an example, the first N bits are reserved/used for Uu-interface HARQ feedback and the other M bits are reserved/used for sidelink HARQ feedbacks. In another example, different time/frequency locations are reserved/used for Uu-interface and sidelink HARQ feedbacks separately by (pre-)configuration or dynamic signaling.

In an example, a Tx UE can be configured to transmit one of the two types of information by dropping either the sidelink HARQ feedback or the Uu-interface HARQ feedback/control/data according to a pre-defined rule. The pre-defined rule can be based on channel priority (e.g., a higher priority of HARQ ACK/NACK than control/data channel), link priority (e.g., a higher priority of Uu link than sidelink), ACK/NACK priority of Uu-interface or sidelink HARQ feedback (e.g., higher priority for NACK than ACK, or vice versa), and/or service (traffic type) priority (e.g., a higher priority of a sidelink with a service priority value indicated in an SCI than an enhanced mobile broadband (eMBB) service over a Uu interface).

Figure 7:
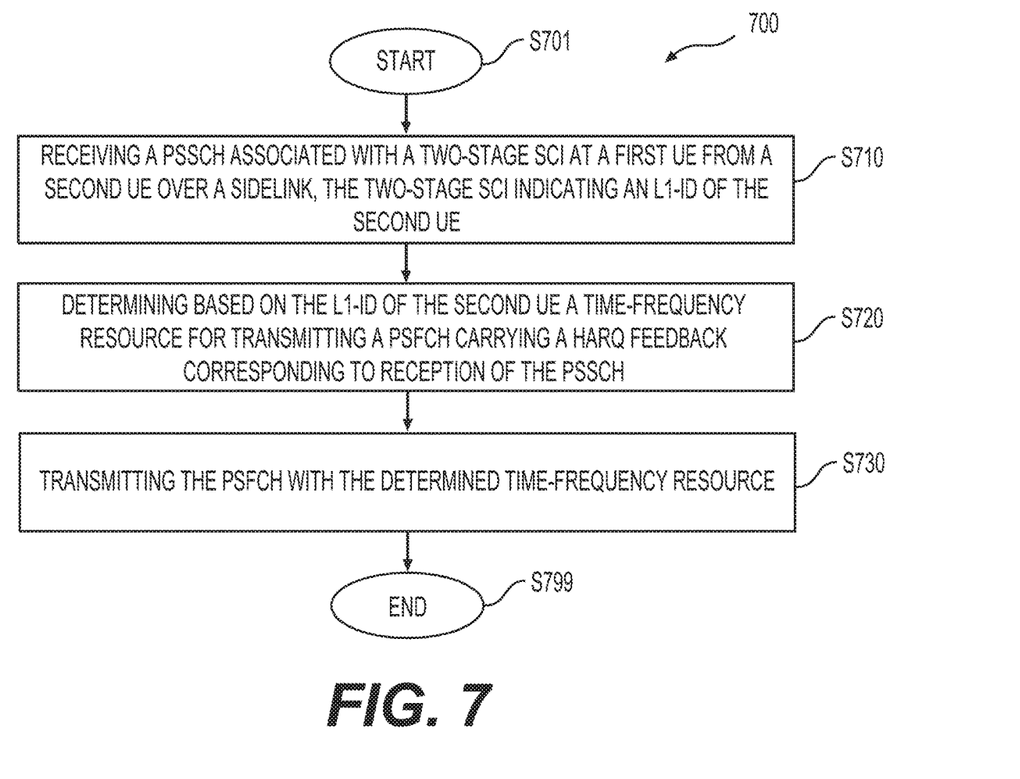
FIG. 7 shows a process 700 of sidelink transmission with two-stage SCI according to an embodiment of the disclosure.

FIG. 7 shows a process 700 of sidelink transmission with two-stage SCI according to an embodiment of the disclosure. The process 700 can be performed by a first UE communicating with a second UE over a sidelink. The process 700 can start from S701, and proceed to S710.

At S710, a PSSCH associated with a two-stage SCI can be received at the first UE from the second UE over the sidelink. The two-stage SCI can indicate an L1-ID of the second UE. For example, the L1-ID can be a source ID identifying the second UE. The L1-ID can be carried in a 1st-stage SCI or a 2nd-stage SCI of the two-stage SCI. Transmission of the PSSCH can be of a groupcast type or a unicast type.

At S720, a time-frequency resource for transmitting a PSFCH can be determined based on the L1-ID of the second UE. The PSFCH can carry a HARQ feedback corresponding to reception of the PSSCH at S710. For example, based on the timing (e.g., slot) of the PSSCH, a slot for transmitting the PSFCH can be determined. Based on a frequency location of the PSSCH, a set of RBs for HARQ feedback transmission can be determined in a PSFCH symbol in the determined slot for transmitting the PSFCH. Based on the L1-ID of the second UE, one RB can be selected from the set of RBs according to a mapping rule between the RBs and different L1 source IDs.

For example, for a unicast transmission or a groupcast transmission with Mode 1 HARQ feedback of the PSSCH at S710, the L1-ID of the second UE can be used for selecting the RB. For a groupcast transmission with Mode 2 HARQ feedback, the L1 ID of the second UE and an L1-ID of the first UE can be combined for selection of the RB.

At S730, the PSFCH can be transmitted with the time-frequency resource determined at S720. The process 700 can then proceed to S799 and terminate at S799.

Figure 8:
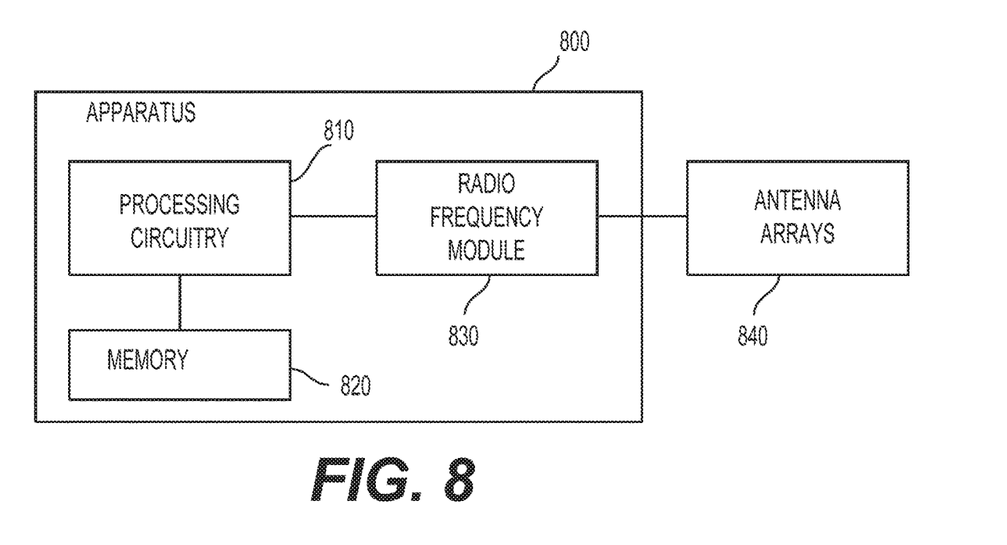
FIG. 8 shows an apparatus 800 according to embodiments of the disclosure.

FIG. 8 shows an exemplary apparatus 800 according to embodiments of the disclosure. The apparatus 800 can be configured to perform various functions in accordance with one or more embodiments or examples described herein. Thus, the apparatus 800 can provide means for implementation of mechanisms, techniques, processes, functions, components, systems described herein. For example, the apparatus 800 can be used to implement functions of UEs or BSs in various embodiments and examples described herein. The apparatus 800 can include a general purpose processor or specially designed circuits to implement various functions, components, or processes described herein in various embodiments. The apparatus 800 can include processing circuitry 810, a memory 820, and a radio frequency (RF) module 830.

In various examples, the processing circuitry 810 can include circuitry configured to perform the functions and processes described herein in combination with software or without software. In various examples, the processing circuitry 810 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 810 can be a central processing unit (CPU) configured to execute program instructions to perform various functions and processes described herein. Accordingly, the memory 820 can be configured to store program instructions. The processing circuitry 810, when executing the program instructions, can perform the functions and processes. The memory 820 can further store other programs or data, such as operating systems, application programs, and the like. The memory 820 can include non-transitory storage media, such as a read only memory (ROM), a random access memory (RAM), a flash memory, a solid state memory, a hard disk drive, an optical disk drive, and the like.

In an embodiment, the RF module 830 receives a processed data signal from the processing circuitry 810 and converts the data signal to beamforming wireless signals that are then transmitted via antenna arrays 840, or vice versa. The RF module 830 can include a digital to analog converter (DAC), an analog to digital converter (ADC), a frequency up converter, a frequency down converter, filters and amplifiers for reception and transmission operations. The RF module 830 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 840 can include one or more antenna arrays.

The apparatus 800 can optionally include other components, such as input and output devices, additional or signal processing circuitry, and the like. Accordingly, the apparatus 800 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving a physical sidelink shared channel (PSSCH) associated with a first two-stage sidelink control information (SCI) at a first user equipment (UE) from a second UE over a sidelink, the first two-stage SCI indicating a physical layer identity (L1-ID) of the second UE;
   determining based on the L1-ID of the second UE a time-frequency resource for transmitting a physical sidelink feedback channel (PSFCH) carrying a hybrid automatic repeat request (HARQ) feedback corresponding to reception of the PSSCH;
   transmitting the PSFCH with the determined time-frequency resource; and
   transmitting from the first UE a second two-stage SCI, a 2nd-stage SCI of the second two-stage SCI being mapped to resources that are indicated by a 1st-stage SCI of the second two-stage SCI, wherein the resources are used for data transmission associated with the second two-stage SCI when there is the data transmission associated with the second two-stage SCI, and the resources are used for 2nd-stage SCI transmission when there is no data transmission associated with the second two-stage SCI.

2. The method of claim 1, wherein transmission of the PSSCH from the second UE is a groupcast transmission or a unicast transmission.

3. The method of claim 1, wherein
   the second two-stage SCI includes a field indicating whether there is the data transmission associated with the second two-stage SCI.

4. The method of claim 3, wherein the 1st-stage SCI of the second two-stage SCI indicates there is no data transmission associated with the second two-stage SCI.

5. The method of claim 1, further comprising:
   transmitting a second two-stage SCI in a groupcast transmission from the first UE, a 1st-stage or a 2nd-stage SCI of the second two-stage SCI indicating a transmission power of the first UE for the groupcast transmission.

6. The method of claim 1, further comprising:
   receiving a second two-stage SCI from a third UE performing a groupcast transmission, a 1st-stage or a 2nd-stage SCI of the second two-stage SCI indicating a transmission power of the third UE;
   determining a pathloss for the groupcast transmission between the third UE and the first UE based on the indicated transmission power of the third UE; and
   determining a transmission power for transmitting a PSFCH from the first UE to the third UE according to the determined pathloss.

7. The method of claim 1, further comprising:
   transmitting a PSSCH over a sidelink from the first UE using a resource scheduled by a base station serving the first UE;
   receiving in a slot a HARQ feedback in a PSFCH corresponding to the transmitted PSSCH; and
   forwarding the received HARQ feedback to the base station using a resource reserved for a physical uplink control channel (PUCCH) or a physical uplink shared channel (PUSCH), a timing of the reserved resource being the slot plus a configured time offset.

8. The method of claim 1, further comprising:
   receiving at the first UE multiple HARQ feedbacks from a third UE at a same slot corresponding to multiple sidelink transmissions from the first UE to the third UE; and
   forwarding the multiple HARQ feedbacks to a base station in a resource reserved for a PUCCH or a PUSCH.

9. An apparatus, comprising circuitry configured to:
   receive a physical sidelink shared channel (PSSCH) associated with a first two-stage sidelink control information (SCI) at a first user equipment (UE) from a second UE over a sidelink, the first two-stage SCI indicating a physical layer identity (L1-ID) of the second UE;
   determine based on the L1-ID of the second UE a time-frequency resource for transmitting a physical sidelink feedback channel (PSFCH) carrying a hybrid automatic repeat request (HARQ) feedback corresponding to reception of the PSSCH;
   transmit the PSFCH with the determined time-frequency resource; and
   transmit from the first UE a second two-stage SCI, a 2nd-stage SCI of the second two-stage SCI being mapped to resources that are indicated by a 1st-stage SCI of the second two-stage SCI, wherein the resources are used for data transmission associated with the second two-stage SCI when there is the data transmission associated with the second two-stage SCI, and the resources are used for 2nd-stage SCI transmission when there is no data transmission associated with the second two-stage SCI.

10. The apparatus of claim 9, wherein transmission of the PSSCH from the second UE is a groupcast transmission or a unicast transmission.

11. The apparatus of claim 9, wherein
    the second two-stage SCI includes a field indicating whether there is the data transmission associated with the second two-stage SCI.

12. The apparatus of claim 11, wherein the 1st-stage SCI of the second two-stage SCI indicates there is no data transmission associated with the second two-stage SCI.

13. The apparatus of claim 9, wherein the circuitry is further configured to:
transmit a second two-stage SCI in a groupcast transmission from the first UE, a 1st-stage or a 2nd-stage SCI of the second two-stage SCI indicating a transmission power of the first UE for the groupcast transmission.

14. The apparatus of claim 9, wherein the circuitry is further configured to:
receive a second two-stage SCI from a third UE performing a groupcast transmission, a 1st-stage or a 2nd-stage SCI of the second two-stage SCI indicating a transmission power of the third UE;
determine a pathloss for the groupcast transmission between the third UE and the first UE based on the indicated transmission power of the third UE; and
determine a transmission power for transmitting a PSFCH from the first UE to the third UE according to the determined pathloss.

15. The apparatus of claim 9, wherein the circuitry is further configured to:
transmit a PSSCH over a sidelink from the first UE using a resource scheduled by a base station serving the first UE;
receive in a slot a HARQ feedback in a PSFCH corresponding to the transmitted PSSCH; and
forward the received HARQ feedback to the base station using a resource reserved for a physical uplink control channel (PUCCH) or a physical uplink shared channel (PUSCH), a timing of the reserved resource being the slot plus a configured time offset.

16. The apparatus of claim 9, wherein the circuitry is further configured to:
receive at the first UE multiple HARQ feedbacks from a third UE at a same slot corresponding to multiple sidelink transmissions from the first UE to the third UE; and
forward the multiple HARQ feedbacks to a base station in a resource reserved for a PUCCH or a PUSCH.

17. A non-transitory computer-readable medium storing instructions that, when executed by a processor, causing the processor to perform a method, the method comprising:
receiving a physical sidelink shared channel (PSSCH) associated with a first two-stage sidelink control information (SCI) at a first user equipment (UE) from a second UE over a sidelink, the first two-stage SCI indicating a physical layer identity (L1-ID) of the second UE;
determining based on the L1-ID of the second UE a time-frequency resource for transmitting a physical sidelink feedback channel (PSFCH) carrying a hybrid automatic repeat request (HARQ) feedback corresponding to reception of the PSSCH;
transmitting the PSFCH with the determined time-frequency resource; and
transmitting from the first UE a second two-stage SCI, a 2nd-stage SCI of the second two-stage SCI being mapped to resources that are indicated by a 1st-stage SCI of the second two-stage SCI, wherein the resources are used for data transmission associated with the second two-stage SCI when there is the data transmission associated with the second two-stage SCI, and the resources are used for 2nd-stage SCI transmission when there is no data transmission associated with the second two-stage SCI.

18. The non-transitory computer-readable medium of claim 17, wherein transmission of the PSSCH from the second UE is a groupcast transmission or a unicast transmission.

* * * * *